(12) United States Patent
Ravuri et al.

(10) Patent No.: US 12,335,987 B2
(45) Date of Patent: Jun. 17, 2025

(54) SYSTEMS AND METHODS FOR MULTIPLEXING MULTIPLE WIRELESS TECHNOLOGIES IN RESOURCE CONSTRAINED ENVIRONMENT BASED ON SPECTRAL UTILIZATION

(71) Applicant: EdgeQ, Inc., Santa Clara, CA (US)

(72) Inventors: Vinay Ravuri, Cupertino, CA (US); Sriram Rajagopal, Karnataka (IN); Mathivanan Prabhakaran, Bengaluru (IN)

(73) Assignee: EdgeQ, Inc., Santa Clara, CA (US)

(*) Notice: Subject to any disclaimer, the term of this patent is extended or adjusted under 35 U.S.C. 154(b) by 154 days.

(21) Appl. No.: 18/142,806

(22) Filed: May 3, 2023

(65) Prior Publication Data

US 2023/0276479 A1 Aug. 31, 2023

Related U.S. Application Data

(63) Continuation of application No. 17/380,590, filed on Jul. 20, 2021, now Pat. No. 11,690,089.

(51) Int. Cl.
*H04W 72/50* (2023.01)
*H04L 5/00* (2006.01)
(Continued)

(52) U.S. Cl.
CPC ......... *H04W 72/535* (2023.01); *H04L 5/0064* (2013.01); *H04W 72/044* (2013.01); *H04W 72/52* (2023.01); *H04W 72/56* (2023.01)

(58) Field of Classification Search
CPC ... H04W 72/535; H04W 72/53; H04W 72/52; H04W 72/50; H04W 72/51; H04W 72/56;
(Continued)

(56) References Cited

U.S. PATENT DOCUMENTS

2022/0132315 A1* 4/2022 Kolekar ............. H04W 12/106
2022/0151022 A1* 5/2022 Chikkur Dattatraya ....................
H04L 69/323
(Continued)

FOREIGN PATENT DOCUMENTS

WO WO 2019154518 * 2/2018 ............. H04B 1/715
WO WO 2021152633 * 1/2021 ............. H04W 16/14

*Primary Examiner* — Phong La
(74) *Attorney, Agent, or Firm* — Michael North (57) ABSTRACT

With advanced compute capabilities and growing convergence of wireless standards, there is requirement to run multiple wireless standards, e.g., 4G, 5G, and Wi-Fi, on a single hardware together. Typical solution includes reserving some computing resources for specific wireless standards. Such a resource strategy may not be optimized or efficient according to the real needs for various wireless standards. The present disclosure presents embodiments of using a unified resource controller to take multiple scheduling inputs across various wireless standards, allocate resources among a plurality of configurable processing units, and manage hardware components for data path accelerations including forward error correction, and signal processing implementation. The multiplexing multiple wireless technologies based on spectral utilization may improve the efficiency in power consumption and hardware resources utilization.

19 Claims, 9 Drawing Sheets

(51) Int. Cl.
*H04W 72/044* (2023.01)
*H04W 72/52* (2023.01)
*H04W 72/56* (2023.01)

(58) Field of Classification Search
CPC ............... H04W 72/044; H04W 72/04; H04W 72/0457; H04L 5/0064; H04L 5/0078; H04L 5/0058; H04L 5/0048
See application file for complete search history.

(56) References Cited

U.S. PATENT DOCUMENTS

2022/0312481 A1\* 9/2022 Talarico ............ H04W 74/0866
2022/0317931 A1\* 10/2022 Lee ....................... G06F 3/0604

\* cited by examiner

SYSTEMS AND METHODS FOR MULTIPLEXING MULTIPLE WIRELESS TECHNOLOGIES IN RESOURCE CONSTRAINED ENVIRONMENT BASED ON SPECTRAL UTILIZATION

CROSS REFERENCE TO RELATED PATENT APPLICATIONS

This application is a continuation of U.S. patent application Ser. No. 17/380,590, entitled "SYSTEMS AND METHODS FOR MULTIPLEXING MULTIPLE WIRELESS TECHNOLOGIES IN RESOURCE CONSTRAINED ENVIRONMENT BASED ON SPECTRAL UTILIZATION", naming inventors as Vinay Ravuri, Sriram Rajagopal, and Mathivanan Prabhakaran, and filed on Jul. 20, 2021, which application is hereby incorporated herein by reference in its entirety.

TECHNICAL FIELD

The present disclosure relates generally to a unified wireless architecture that supports multiple types of wireless communication and data processing associated therewith. More particularly, the present disclosure relates to a processing architecture that multiplexes and schedules inputs across a variety of different types of wireless signals into a plurality of configurable processing cores.

BACKGROUND

The importance of wireless communication in today's society is well understood by one of skill in the art. Advances in wireless technologies have resulted in the ability to interface with and service many different types of wireless devices using a variety of different types of wireless signals. These advances have resulted in multiple wireless standards that define parameters in which wireless channels are implemented and maintained. These different standards also allocate different wireless spectrum for their use and oftentimes require different operations in the implementation of corresponding wireless connectivity.

Wireless nodes, such as cellular base stations and Wi-Fi access points, service wireless devices within a geographical cell or network. These geographical locations often overlap such that different types of wireless connections may be present within close proximity to each other (although operating at different frequencies). Recently, wireless communication systems have begun to converge to allow a wireless device to connect across a variety of different types of wireless networks. A certain type of wireless signal may provide a preferred wireless connection based on the type of wireless device being serviced, the conditions of the different wireless channels and other parameters known to one of skill in the art. Efficient management of these diverse wireless connections has become increasingly complex.

With advanced compute capabilities and the growing convergence of wireless standards, there is requirement to run multiple wireless standards (e.g., 4G, 5G, and/or Wi-Fi) at a single node. The current hardware architecture within these nodes is less desirable as data paths through the node are dedicated to a single type of wireless communication and oftentimes use components specific to its particular wireless standard. This architecture results in deficiencies in resource use as certain paths/components may be under-utilized over time. As the complexity and inter-operability of these different types of wireless standards increase, improvements in resource flexibility and system configurability will become more important.

Accordingly, what is needed are systems, devices and methods that address the above-described issues.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may not be to scale.

DETAILED DESCRIPTION OF EMBODIMENTS

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," and "comprising" shall be understood to be open terms and any examples are provided by way of illustration and shall not be used to limit the scope of this disclosure.

A service, function, or resource is not limited to a single service, function, or resource; usage of these terms may refer to a grouping of related services, functions, or resources, which may be distributed or aggregated. The use of memory, database, information base, data store, tables, hardware, cache, and the like may be used herein to refer to system component or components into which information may be entered or otherwise recorded. The terms "data," "information," along with similar terms, may be replaced by other terminologies referring to a group of one or more bits, and may be used interchangeably. The terms "packet" or "frame" shall be understood to mean a group of one or more bits. The term "frame" shall not be interpreted as limiting embodiments of the present invention to Layer 2 networks; and, the term "packet" shall not be interpreted as limiting embodiments of the present invention to Layer 3 networks. The terms "packet," "frame," "data," or "data traffic" may be replaced by other terminologies referring to a group of bits, such as "datagram" or "cell." The words "optimal," "optimize," "optimization," and the like refer to an improvement of an outcome or a process and do not require that the specified outcome or process has achieved an "optimal" or peak state.

It shall be noted that: (1) certain steps may optionally be performed; (2) steps may not be limited to the specific order set forth herein; (3) certain steps may be performed in different orders; and (4) certain steps may be done concurrently.

A. Open RAN Deployment Models

A radio access network (RAN) is part of a telecommunication system. It implements a radio access technology (RAT) to provide connection between a device, e.g., a mobile phone, and a core network (CN). Open RAN is an approach based on interoperability and standardization of RAN elements including a unified interconnection standard for white-box hardware and open source software elements from different vendors.

Figure 1:
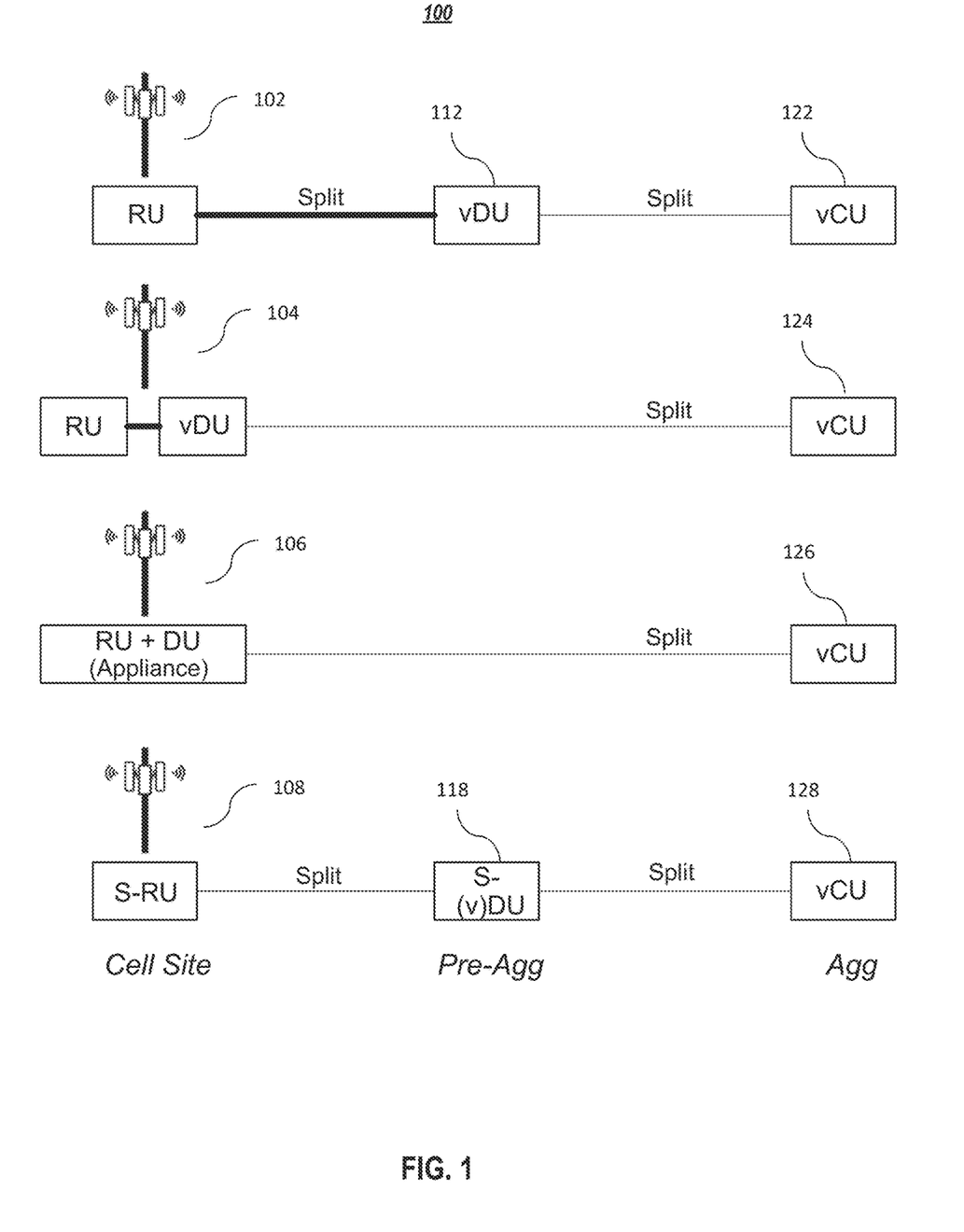
FIG. 1 depicts various open radio access network (RAN) deployments for a telecommunication service provider, according to embodiments of the present disclosure.

FIG. 1 depicts various open radio access network (RAN) deployments for a telecommunication service provider, according to embodiments of the present disclosure. As shown in FIG. 1, a radio unit (RU) 102 may couple to a virtual distribution unit (vDU) 112 with a split, e.g., ORAN 7-2 split, which is a Low PHY/High PHY split for ultra-reliable low-latency communication (URLLC) and near-edge deployment. The vDU 112 then couples to a virtual central unit (vCU) 122 with a split, e.g., split 2, which is referred as radio resource control and packet data convergence control split from the Layer 2 radio link control (RLC). Alternatively, a vDU may be deployed on the side of an RU 104, and then couples to a vCU 124 with a split, e.g., split 2. Alternatively, a DU and an RU may be integrated as an appliance 106, which then couples to a vCU 126 with a split, e.g., split 2. Alternatively, a RU may be a small cell RN (S-RU) 108 couples to a small cell DU or vDU (S-vDU) 118 using a split, e.g., a MAC/PHY layer split (split 6). The S-vDU 118 then couple to a vCU 128 with a split, e.g., split 2.

A service provider (SP) may adopt more than one Open RAN deployment models based on band, fronthaul bandwidth requirements, or deployment type (macro/small cell), etc. Deployment models are influenced or decided based on multiple factors, including Fibre availability, real-estate/site/location constraints at pre-aggregation (Pre-Agg) and cell sites, total cost of ownership (TCO), Operational preference, etc. It is desirable for SPs to achieve maximum consistency around architecture, systems and operational model across all these deployment models.

B. Resource Allocation Across Multiple Wireless Standards

A telecommunication network may need to support various applications, with diverse requirements such as latency, high data rates and real-time support for random traffic demands, across multiple wireless technologies, e.g., 5G new radio (NR), Long Term Evolution (LTE), Wi-Fi, etc. Due to cost restrictions, operational resources for communication across these wireless technologies may need to be shared, at least partially.

In a typical implementation, each wireless standard has some specifically reserved resources (encoders/decoders/signal processing). However, with such an approach, compute resources are used inefficiently when implementing multiple wireless standards on a single computation system on chip (SoC) or hardware acceleration. For example, a communication device, e.g., a base station, services both 5G and LTE communication with resources reserved for each wireless standard. Therefore, data paths corresponding to 5G and LTE are separated from each other. When 5G communication served by the base station is less demanding, the resources reserved for 5G would not be used fully with some of 5G-reserved resources idling. Such idling resource in the base station may not be able to be used to serve LTE communication. When LTE communication demands are increasing, the base station may have a challenge to meet the increasing LTE communication needs with a desired quality of service (QoS).

The present disclosure describes system and method embodiments to achieve efficient use of resources by PHY virtualization, especially when spectrum is shared. A PHY implementation of a wireless standards involves components comprising control software implementation of standard functions, managing the hardware components, and data path accelerations, etc. The data path accelerations may be including but not limited to Forward Error Correction (FEC), e.g., encoding and decoding, and signal processing implementation, e.g., channel estimation, measurements, and equalization. Although there are variations in each wireless standard, at least some of the control and hardware accelerations have commonality, e.g., hardware acceleration for encode and/or decode. If these resources are managed to leverage the commonality, the efficiency in power consumption, hardware resources utilization may be improved.

Figure 2:
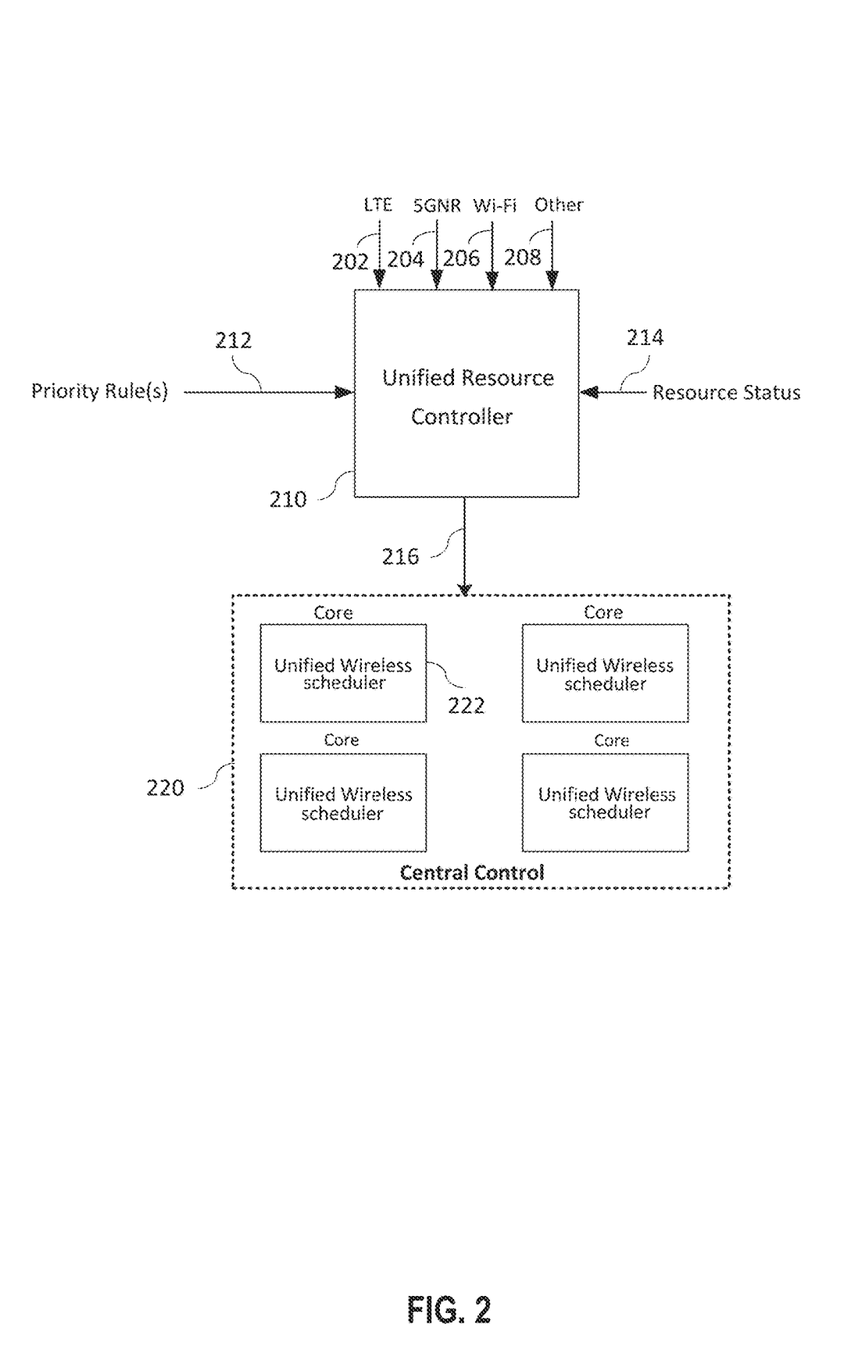
FIG. 2 depicts a unified controller managing resources allocation for multiple wireless scheduling inputs across various standards, according to embodiments of the present disclosure.

FIG. 2 depicts a unified resource controller (URC) managing resources allocation for multiple wireless scheduling inputs across various standards, according to embodiments of the present disclosure. The URC 210 takes a plurality of wireless scheduling inputs across various wireless standards for resource allocation or assignment. The URC 210 may reside in a telecommunication device, e.g., a base station, a cell, a 5G femtocell, etc. The wireless scheduling inputs may include one or more of an LTE scheduling input 202, a 5G NR scheduling input 204, a Wi-Fi scheduling input 206, or other wireless scheduling input 208 (e.g., a machine learning (ML) scheduling input).

The resource allocation or assignment may comprise assigning dedicated resources for each wireless standard and shared resources across the various wireless standards. In one or more embodiments, shared resources are determined every slot or subframe based on dedicated resources in that slot or subframe for each wireless standard.

Based at least on one or more priority rules, the URC 210 generates a resource control signal 216 to a center processing unit 220 comprising one or more configurable processing units 222, which are allocated to process the plurality of wireless scheduling inputs based on the resource control signal 216. The configurable processing units 222 may be hardware, software, or a combination of hardware and software processing units. The center processing unit 220 may be a multi-core processor comprising multiple cores with each core configurable for wireless schedule processing. In one or more embodiments, the configurable processing unit 222 is a core based on RISC-V architecture. As a layered and extensible instruction set architecture (ISA), RISC-V may enable a platform for the cores in the center processing unit 220 highly configurable for various task. One skilled in the art will recognize that other types of processing cores may be implemented across different embodiments of the invention. In one or more embodiments, the configurable processing unit 222 may function as a unified wireless scheduler to implement various scheduling computation or operation, e.g., encoder/decoder scheduling or 5G NR scheduling, according to assignment specified in the resource control signal 216.

The one or more priority rules comprise a standard priority rule to set priorities for the plurality of wireless scheduling inputs across different wireless standards, and/or a carrier priority rule to set priorities for multiple carriers within a standard. Besides the one or more priority rules, the URC 210 may also take into considerations of a resource status 214 to generate the resource control signal 216. The resource status 214 may comprises current and/or scheduled load information for each of the one or more configurable processing units 222. With the awareness of the resource status 214, the URC 210 may implement load balancing when generating the resource control signal 216 to optimally load each of the resources under the one or more priority rules and timelines.

Additionally, the URC 210 may potentially be used for clock gating/powering down certain resources if those resources are unused. For example, (N−1) out of N low-density parity-check (LDPC) instances may be clock gated if all transport blocks (TBs) in current slot can be processed with just 1 LDPC instance. In another example, an encoder may be clock gated completely on uplink (UL) slots.

The URC 210 may implement static, semi-static, or real-time resource allocation. In certain situations, e.g., when a hysteresis of resource is required, dynamic resource allocations may be challenging. Certain data, e.g., channel estimation data, may need to be used across time for equalization. In such situations, a semi-static or a static allocation may be used by the URC 210.

Figure 3:
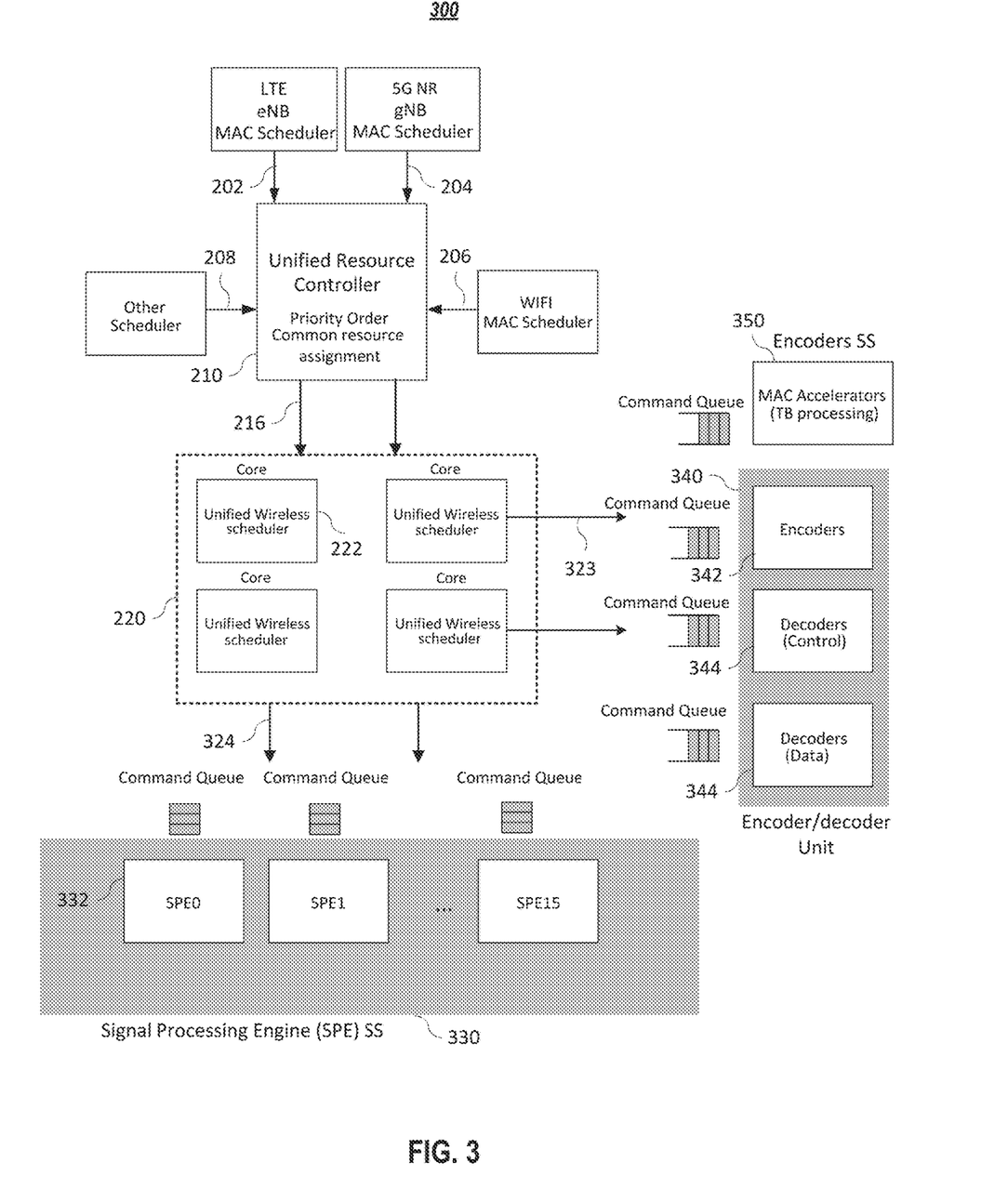
FIG. 3 depicts a unified controller managing resources for multiple physical layer (PHY) standards by allocating resources to different standards, according to embodiments of the present disclosure.

FIG. 3 depicts a unified controller managing resources for multiple physical layer (PHY) standards by allocating resources to different standards, according to embodiments of the present disclosure. Based on the resource control signal 216, the center processing unit 220 allocates the one or more configurable processing units 222 to process the plurality of wireless scheduling inputs and generate one or more commands (CMDs), which are transmitted to one or more respectively hardware acceleration components for further processing. The one or more commands may comprise a command for a medium access control (MAC) accelerator 350 for transport block (TB) processing, one or more forward error correction (FEC) commands 323 to an encoder/decoder unit 340, e.g., encoders 342, decoders for control 344, decoders for data 346, etc. The one or more commands may also comprise one or more signal processing engine (SPE) commands 324, which are sent to a SPE 330. The SPE 330 may comprise a plurality of SPE units 332 to implement desired signal processing, e.g., channel estimation, measurements, equalization, etc., based on the SPE commands 324.

Figure 4:
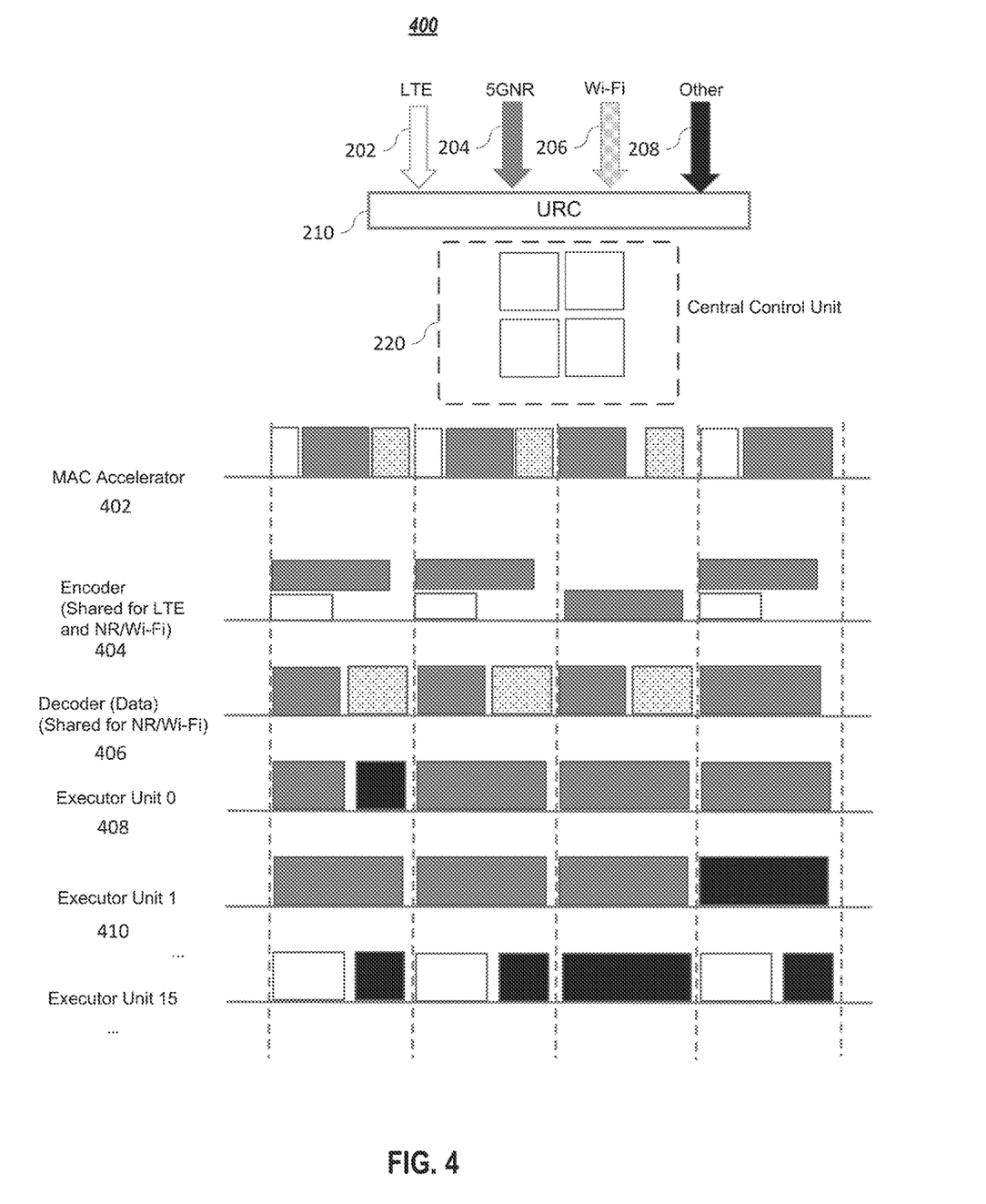
FIG. 4 depicts an example of allocation of resources over time to different wireless standards, according to embodiments of the present disclosure.

FIG. 4 depicts an example of allocation of resources over time to different wireless standards, according to embodiments of the present disclosure. The central control unit 220 outputs a plurality of commands for corresponding hardware acceleration components to implement resource allocation. The plurality of commands comprise a command 402 for MAC accelerator, a command 404 for encoder (which may be shared for LTE and NR/Wi-Fi), a command 406 for data decoder (which may be shared for NR and Wi-Fi), multiple commands 408, 410 . . . for executor units (which may correspond to the SPE units 332 shown in FIG. 3). As shown in FIG. 4, the allocated time interval corresponding to the various wireless standards may not be the same among the plurality of commands. The central control unit 220 may provide slot level configuration and commands at a desired granularity towards respective hardware acceleration components. The desired granularity may be a slot, packet, symbol, or block level of granularity (e.g., for encoders or decoders), or other granularity known to one of skill in the art. In one or more embodiments, the desired granularity may be different among the plurality of commands, or among wireless standards, or among the destinations for the commands. For example, a granularity of scheduling (slot time/packet interval) may be 0.5 ms for 5G NR, 1 ms for LTE, or up to 10 s of ms for a Physical-Layer Protocol Data Unit (PPDU) in a Wi-Fi scheduling.

Figure 5:
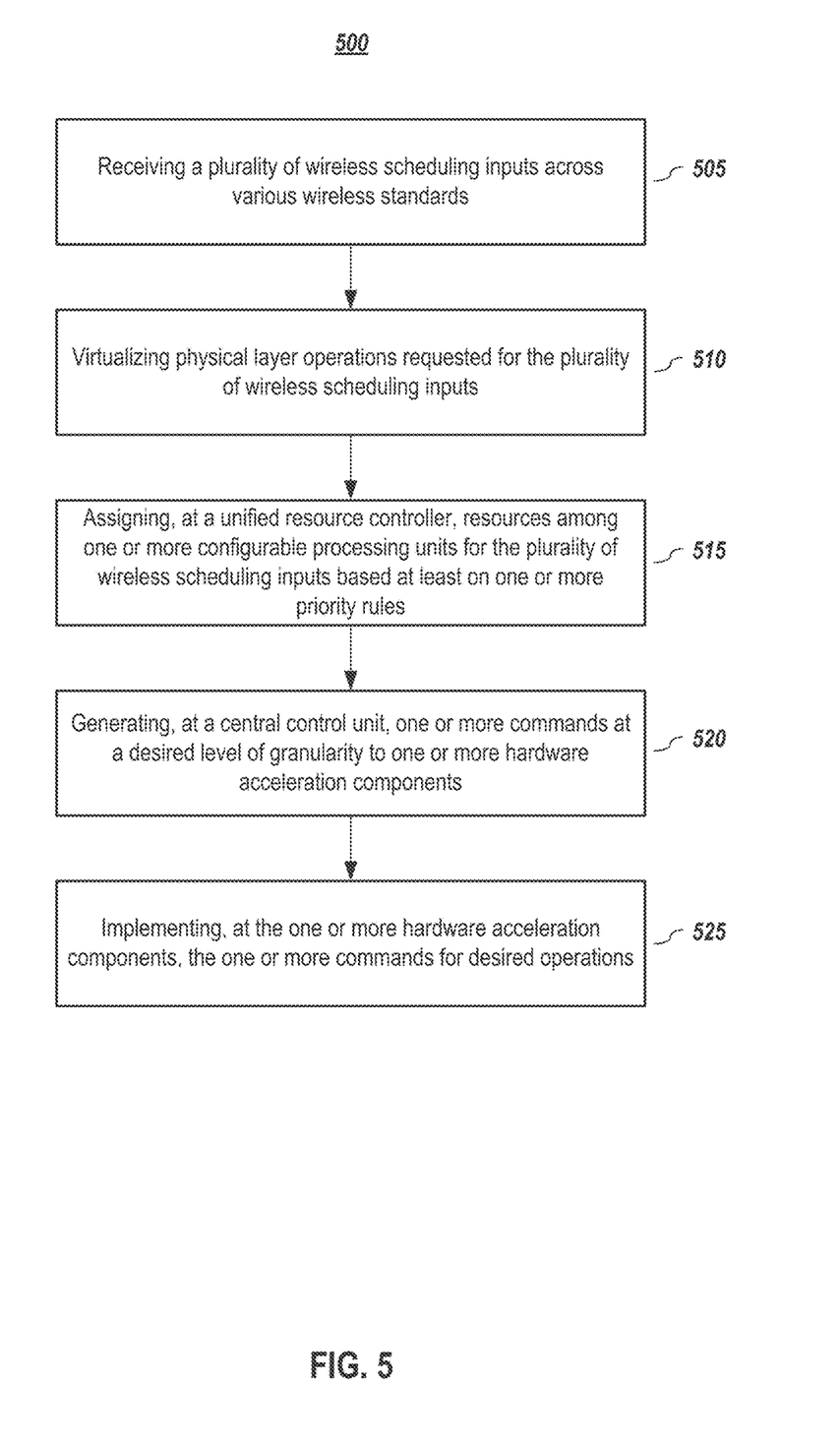
FIG. 5 depicts a process of allocating resources to different standards, according to embodiments of the present disclosure.

FIG. 5 depicts a process of allocating resources to different standards, according to embodiments of the present disclosure. In step 505, a URC receives a plurality of wireless scheduling inputs across various wireless standards, e.g., 5G NR, LTE, Wi-Fi, etc. In step 510, the URC virtualizes physical layer operations requested for the plurality of wireless scheduling inputs. In step 515, the URC assigns resources among one or more configurable processing units in a central control unit for the plurality of wireless scheduling inputs based at least on one or more priority rules. In step 520, the central control unit generates one or more commands at a desired level of granularity to one or more hardware acceleration components. In step 525, the one or more hardware acceleration components respectively implement the one or more commands for desired operations.

C. Architecture for Resource Managing and Allocation

Figure 6:
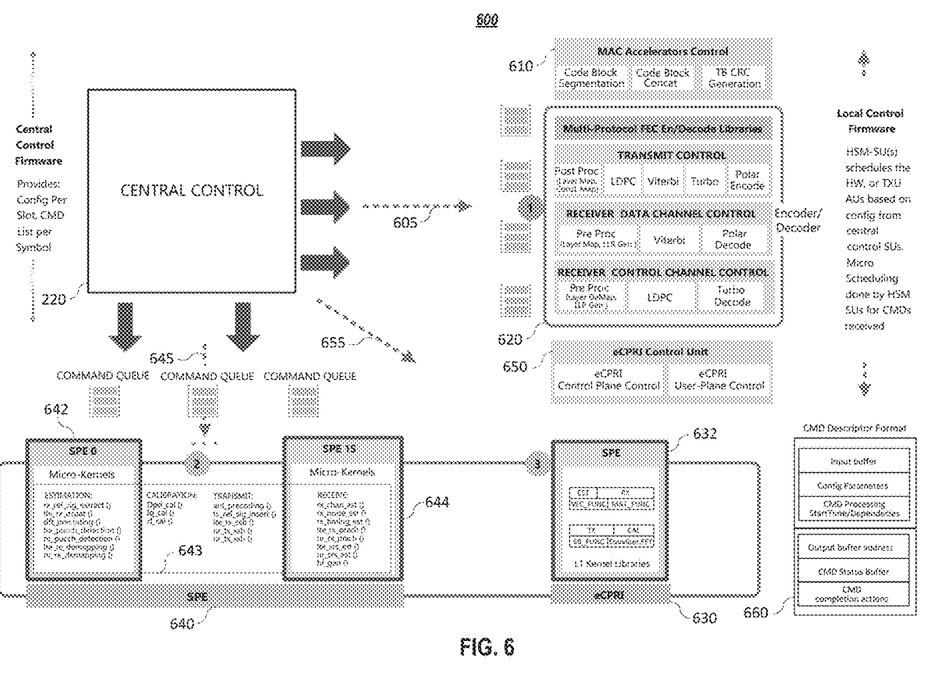
FIG. 6 depicts architecture for resource managing and allocation, according to embodiments of the present disclosure.

FIG. 6 depicts architecture for resource managing and allocation, according to embodiments of the present disclosure. The architecture comprises a central control unit 220, a plurality of hardware acceleration components, e.g., a MAC accelerator 610, an encoder and decoder unit 620, an enhanced common public radio interface (eCPRI) unit 630, an SPE 640, etc. The central control unit 220 may provide configuration per slot and one or more commands to one or more hardware acceleration components. at a desired level of granularity (e.g., a symbol level). The one or more commands may comprise one or more FEC commands 605, one or more SPE commands 635, and an eCPRI command 655.

MAC accelerator 610 may implement various MAC accelerations, e.g., code block segmentation, code block concatenation, or TB cyclic redundancy check (CRC) generation, based on a MAC acceleration command sent from central control unit 220. The SPE 640 may comprise a plurality of SPE units 642 to implement desired signal processing, e.g., channel estimation, measurements, equalization, etc., based on the one or more FEC commands 605. In one or more embodiments, the plurality of SPE units 642 may comprise one SPE unit configured for transmit or encoder control, one SPE unit for receiver or decoder data channel control, one SPE unit for receiver or decoder control channel control.

The SPE 640 may comprise a plurality of SPE units 642, 644, etc., to implement desired signal processing, e.g., channel estimation, measurements, equalization, etc., based on the one or more SPE commands 645. In one or more embodiments, a SPE unit may be an executor unit for waveform transmitting, receiving, or both. A SPE unit may comprise a micro-kernel 643 for lower PHY execution, based on a corresponding SPE command. The micro-kernel 643 comprises control codes to facilitate interactions between hardware and software components, handle input/output (I/O) requests, etc.

A SPE may also implement acceleration operations to support eCPRI, e.g., compression/decompression for the eCPRI to optimize packet sizes. For example, the SPE 632 for eCPRI support may communicate with an eCPRI control unit 650 and provide data to it. The eCPRI control unit 650 may implement eCPRI control plane control and/or eCPRI user plane control, based on eCPRI command 655.

In one or more embodiments, each command generated by the central control unit 220 has a descriptor format 660. The command may comprise an input buffer, one or more configuration parameters, CMD processing start time and dependencies, output buffer address, CMD status buffer, and one or more CMD completion actions. Such a descriptor format ensures that the CMD may be addressed to a corresponding command queue and may be implemented by a receiving unit properly.

The one or more commands may comprise one or more commands 323, which are sent to FEC related hardware acceleration components 340, e.g., encoders 342, decoders for control 344, decoders for data 346, etc. The one or more commands may also comprise one or more signal processing engine (SPE) commands 324, which are sent to a SPE 330. The SPE 330 may comprise a plurality of SPE units 332 to implement desired signal processing, e.g., channel estimation, measurements, equalization, etc., based on the SPE commands 324.

Figure 7:
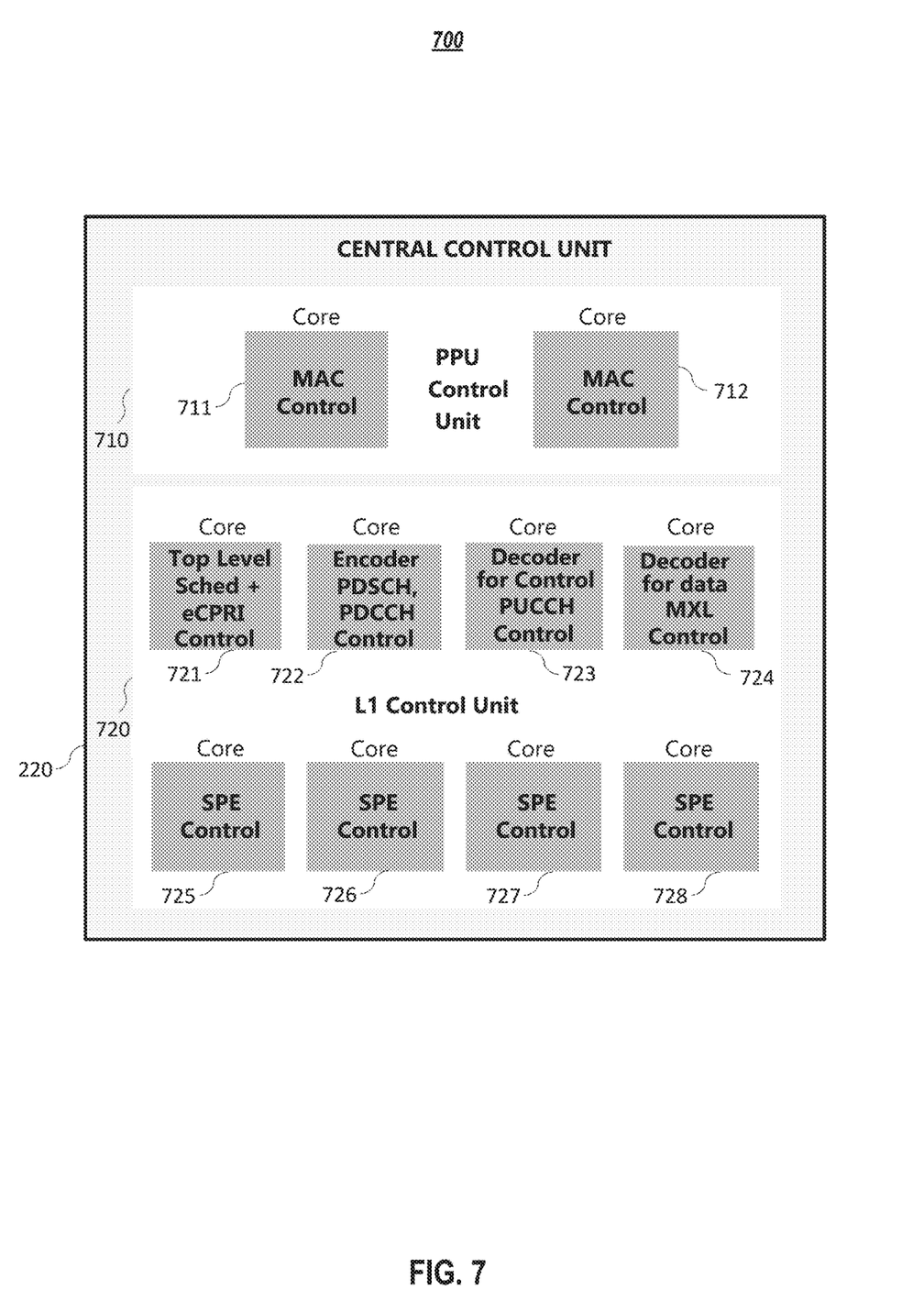
FIG. 7 depicts a block diagram of a central control unit, according to embodiments of the present disclosure.

FIG. 7 depicts a block diagram of a central control unit, according to embodiments of the present disclosure. The central control unit 220 comprises a plurality of cores, which may be grouped into a packet processing unit (PPU) control unit 710 or a layer 1 (L1, or PHY) control unit 720. As shown in FIG. 7, the PPU control unit 710 comprises a first core 711 and a second core 712 for MAC control. The L1 control unit 720 comprises a core 721 for top level scheduling and eCPRI control, a core 722 for encoder Physical Downlink Shared Channel (PDSCH) and Physical Downlink Control Channel (PDCCH) control, a core 723 for decoder (for control) Physical Uplink Control Channel (PUCCH) control, a core 724 for decoder (for control) MAC Acceleration (MXL) control, a plurality of cores 725~728 for SPE control. It shall be understood that the central control unit 220 allocates the plurality of cores according to the resource control signal 216 generated by the URC 210, and the allocation may be different from the embodiment shown in FIG. 7. While FIG. 7 depicts individual cores configured to implement processing control for different RATs, the central control unit may also be a task based multi-core unit. The control processing for different operations/modules may be statically assigned as described in FIG. 4, or dynamically assigned in a task-based architecture where each core picks up one or more tasks for scheduling.

Figure 8:
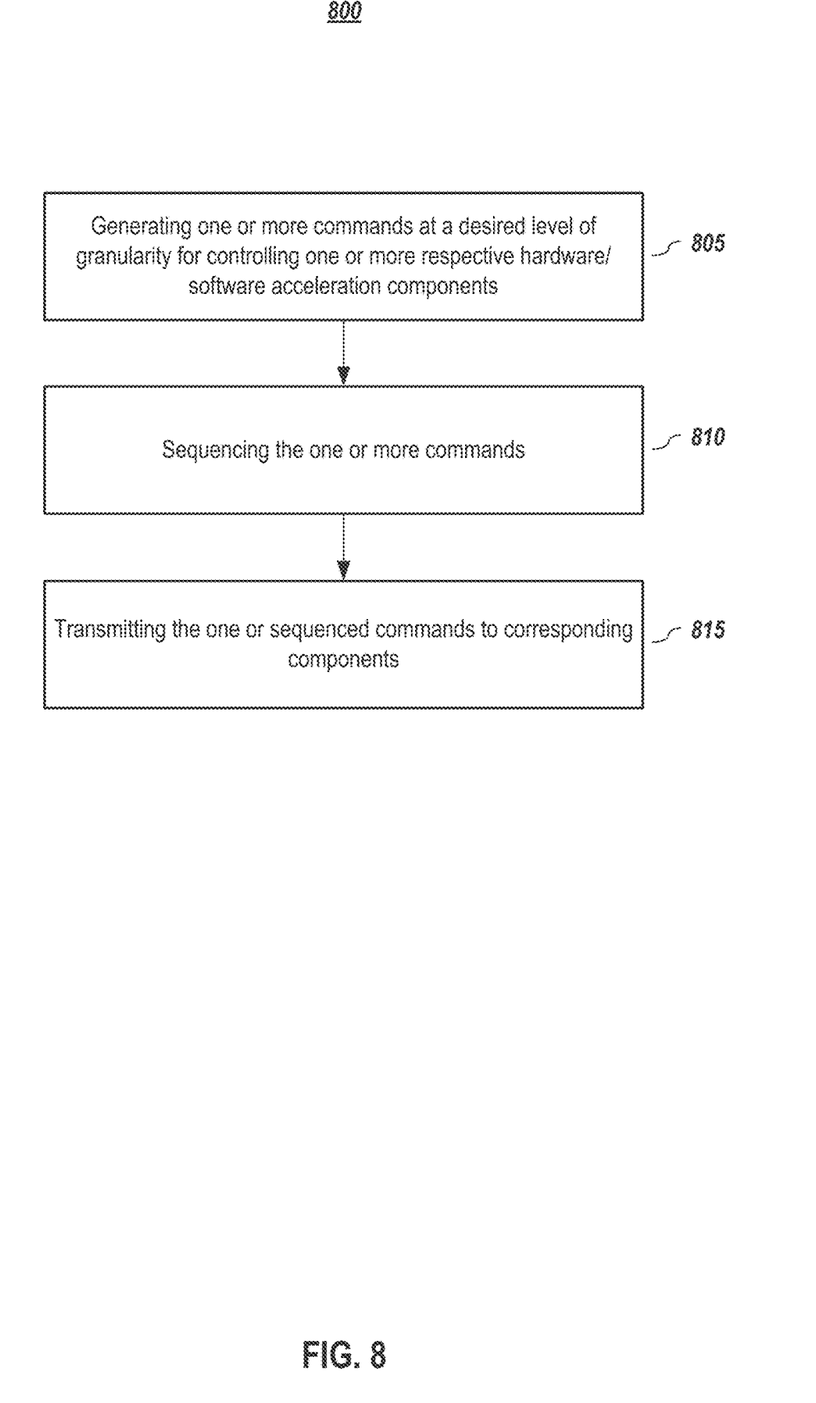
FIG. 8 depicts a process of central control of resource allocation, according to embodiments of the present disclosure.

FIG. 8 depicts a process of central control of resource allocation, according to embodiments of the present disclosure. In step 805, the central control unit generates one or more configuration and commands at a desired level of granularity to one or more hardware/software acceleration components. Each command may provide time or events at which the command needs to be executed by a local control firmware. Exemplary format of a command is shown as the format 660 in FIG. 6. The configuration may be a slot level configuration and the desired granularity may be a symbol level of granularity, a block level of granularity (e.g., for encoders or decoders), etc. In one or more embodiments, the desired granularity may be different among the plurality of commands, or among wireless standards, or among the destinations for the commands. For example, the desired granularity for FEC commands may be different from the desired granularity for SPE commands. In step 810, the one or more commands are sequenced for transmit to respective destinations. In step 815, the one or more sequenced commands are transmitted by the central control unit to corresponding components, e.g., hardware/software acceleration components.

In one or more embodiments, a Hardware State Machine (HSM) on a hardware acceleration component, schedules hardware, or SPE Access Units (AUs) operations based on one or more CMDs from the central control unit. HSM may also implement micro scheduling CMDs received. Local control firmware running on respective HSM process the CMDs and schedule the hardware acceleration component to achieve improved throughput by pipelining received CMDs through different stages of hardware.

In one or more embodiments, control firmware for 5G NR and LTE may be converged. Such a highly flexible control firmware design may address different product configurations with firmware upgrades.

Figure 9:
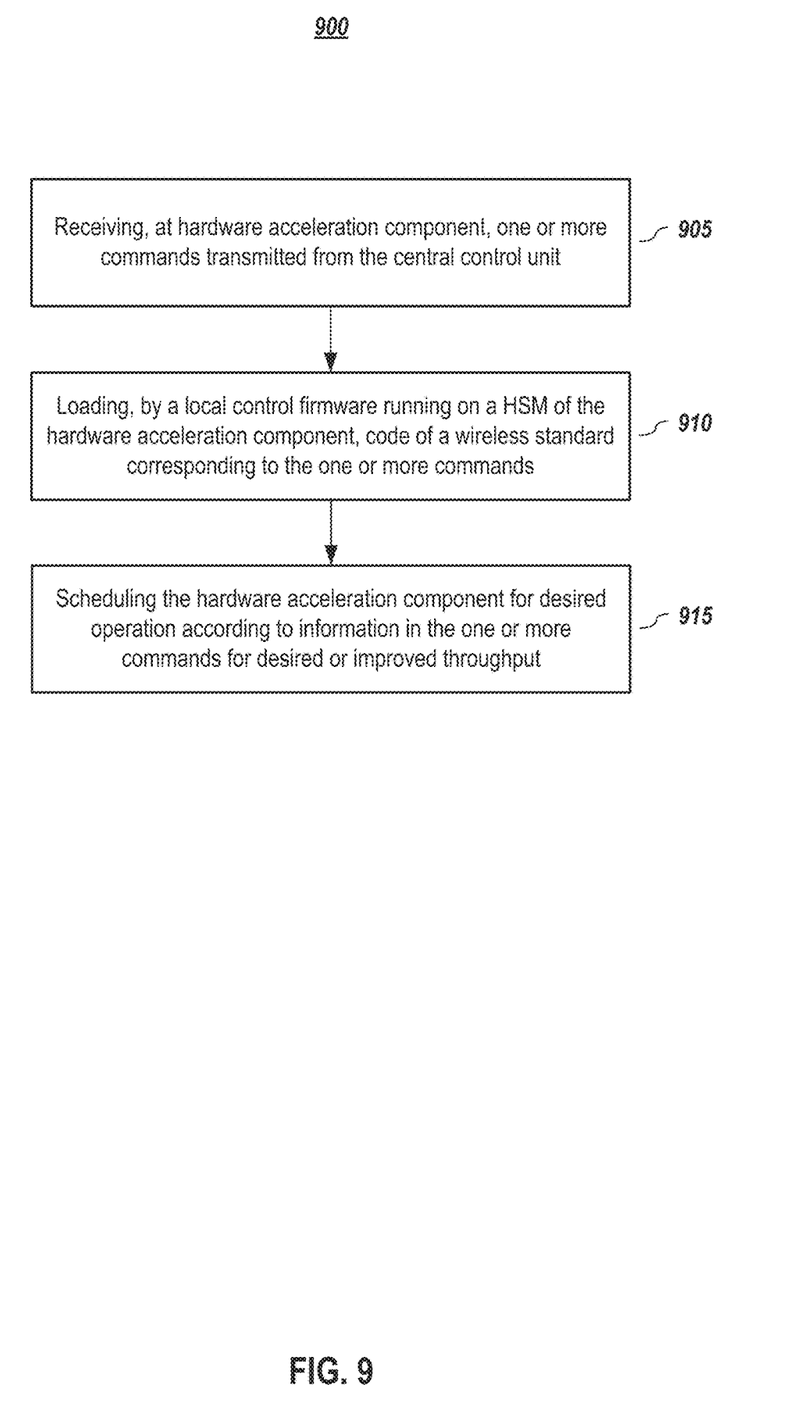
FIG. 9 depicts a process of local control of resource allocation, according to embodiments of the present disclosure.

FIG. 9 depicts a process of local control of resource allocation, according to embodiments of the present disclosure. In step 905, a hardware acceleration component receives one or more commands transmitted from the central control unit. In step 910, a local control firmware running on a HSM of the hardware acceleration component loads code of a wireless standard corresponding to the one or more commands for command processing. In step 915, the local control firmware schedules the hardware acceleration component for desired operation according to information in the one or more commands for desired or improved throughput.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A method for resource allocation across different wireless standards, the method comprising:
   given a plurality of wireless scheduling inputs across multiple wireless standards, allocating a plurality of configurable processing cores in a central control unit into multiple control units with each control units comprising one or more processing cores based at least on the plurality of wireless scheduling inputs, the multiple control units comprise a packet processing unit (PPU) control unit and a layer-1 (L1) control unit; and
   generating, at the central control unit, a plurality of commands corresponding to the plurality of wireless scheduling inputs to one or more hardware or software acceleration components.

2. The method of claim 1, wherein the plurality of commands comprising:
   a MAC acceleration command for one or more MAC accelerations; and
   one or more L1 commands for physical layer (PHY) implementation.

3. The method of claim 1, wherein the multiple wireless standards comprise multiple standards among a group comprising at least 5G new radio (NR), Long Term Evolution (LTE), and Wi-Fi.

4. The system of claim 1, wherein each of the plurality of commands has a descriptor format that comprises one or more configuration parameters, command (CMD) processing start time and dependencies, output buffer address, and one or more CMD completion actions.

5. The method of claim 1, the plurality of commands comprise a MAC acceleration command for one or more MAC accelerations and one or more L1 commands for physical layer (PHY) implementation.

6. The method of claim 5, wherein the one or more L1 commands comprise:
   an enhanced common public radio interface (eCPRI) command that is sent to an eCPRI unit for eCPRI control plane control and eCPRI user plane control.

7. The method of claim 5, wherein the one or more L1 commands comprise:
   one or more signal processing engine (SPE) commands that are sent to an SPE comprising a plurality of SPE units for signal processing comprising one or more of channel estimation, measurements, and equalization.

8. The method of claim 5, wherein the one or more L1 commands comprise:
   one or more Forward Error Correction (FEC) commands that are sent to an encoder and decoder unit for transmit control, receiver data channel control, and receiver control channel control.

9. The method of claim 5, wherein the one or more MAC accelerations comprise one or more of code block segmentation, code block concatenation, and transport block (TB) cyclic redundancy check (CRC) generation.

10. The method of claim 1, wherein the plurality of commands are generated at the central control unit based on a resource control signal for resource assignment among the plurality of configurable processing cores, the resource control signal is generated, at a universal resource controller (URC), based on one or more priority rules comprising a standard priority rule to set priorities for the plurality of wireless scheduling inputs across different wireless standards, a carrier priority rule to set priorities for multiple carriers within a standard, or a combination of the standard priority rule and the carrier priority rule.

11. A system for resource allocation across different wireless standards comprising:

a central control unit comprising a plurality of configurable processing cores that are allocated into multiple control units based at least on a plurality of wireless scheduling inputs across multiple wireless standards, the multiple control units comprise a packet processing unit (PPU) control unit and a layer-1 (L1) control unit, each control unit comprising one or more configurable processing cores among the plurality of configurable processing cores; and wherein the central control unit generates a plurality of commands corresponding to the plurality of wireless scheduling inputs to one or more hardware or software acceleration components.

12. The system of claim 11, wherein the multiple wireless standards comprise multiple standards among a group comprising at least 5G new radio (NR), Long Term Evolution (LTE), and Wi-Fi.

13. The system of claim 12, wherein the plurality of commands comprising:

a MAC acceleration command to a MAC accelerator for one or more MAC accelerations; and one or more L1 commands for physical layer (PHY) implementation.

14. The system of claim 13 further comprising:

an enhanced common public radio interface (eCPRI) unit that receives an eCPRI command, among the one or more L1 commands, for eCPRI control plane control and eCPRI user plane control.

15. The system of claim 13 further comprising:

a signal processing engine (SPE) comprising a plurality of SPE units, the SPE receives one or more SPE commands, among the one or more L1 commands, for signal processing comprising one or more of channel estimation, measurements, and equalization.

16. The system of claim 13 further comprising:

an encoder and decoder unit that receives one or more Forward Error Correction (FEC) commands, among the one or more L1 commands, for transmit control, receiver data channel control, and receiver control channel control.

17. The system of claim 13, wherein the one or more MAC accelerations comprise one or more of code block segmentation, code block concatenation, and transport block (TB) cyclic redundancy check (CRC) generation.

18. The system of claim 11, wherein the plurality of commands are generated based on a resource control signal for resource assignment among the plurality of configurable processing cores.

19. The system of claim 18 further comprising:

a universal resource controller (URC) that generates the resource control signal based on one or more priority rules comprising a standard priority rule to set priorities for the plurality of wireless scheduling inputs across different wireless standards, a carrier priority rule to set priorities for multiple carriers within a standard, or a combination of the standard priority rule and the carrier priority rule.

* * * * *